United States Patent
Kumar et al.

(10) Patent No.: US 10,587,578 B2
(45) Date of Patent: Mar. 10, 2020

(54) FIREWALL RULE MANAGEMENT FOR HIERARCHICAL ENTITIES

(71) Applicant: NICIRA, INC., Palo Alto, CA (US)

(72) Inventors: Vasantha Kumar, Pune (IN); Sriram Gopalakrishnan, Pune (IN); Naveen Ramaswamy, Pune (IN); Anil Kumar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 253 days.

(21) Appl. No.: 15/498,477

(22) Filed: Apr. 27, 2017

(65) Prior Publication Data

US 2018/0176185 A1    Jun. 21, 2018

(30) Foreign Application Priority Data

Dec. 19, 2016   (IN) .............................. 201641043250

(51) Int. Cl.
*H04L 29/06* (2006.01)

(52) U.S. Cl.
CPC ...... *H04L 63/0263* (2013.01); *H04L 63/0236* (2013.01); *H04L 63/104* (2013.01)

(58) Field of Classification Search
CPC ............... H04L 63/104; H04L 63/0236; H04L 63/0263

See application file for complete search history.

(56) References Cited

U.S. PATENT DOCUMENTS

| | | | | |
|---|---|---|---|---|
| 8,032,933 B2* | 10/2011 | Turley | ................ | H04L 63/0263 726/11 |
| 8,082,574 B2* | 12/2011 | Hoff | ...................... | H04L 63/062 726/1 |
| 9,276,904 B2* | 3/2016 | Bansal | ................ | H04L 63/0263 |
| 9,553,845 B1* | 1/2017 | Talmor | ................ | H04L 63/0263 |
| 10,002,173 B1* | 6/2018 | Ramachandran | ......... | G06F 9/50 |
| 2006/0195896 A1* | 8/2006 | Fulp | ..................... | H04L 63/0263 726/11 |
| 2008/0005795 A1* | 1/2008 | Acharya | ............. | H04L 63/0263 726/23 |
| 2009/0138938 A1* | 5/2009 | Harrison | ............... | G06F 21/604 726/1 |
| 2015/0235035 A1* | 8/2015 | Tseitlin | ................... | H04L 43/16 707/785 |
| 2015/0237013 A1* | 8/2015 | Bansal | ................ | H04L 63/0263 726/13 |
| 2015/0281178 A1* | 10/2015 | Raman | ................ | H04L 63/0227 726/13 |
| 2018/0131581 A1* | 5/2018 | DeLuca | .............. | H04L 41/5009 |
| 2018/0176185 A1* | 6/2018 | Kumar | ................ | H04L 63/0263 |

* cited by examiner

*Primary Examiner* — Shin-Hon (Eric) Chen
(74) *Attorney, Agent, or Firm* — Loza & Loza, LLP

(57) ABSTRACT

System and method for managing firewall rules for hierarchical entities modify a processing order of the firewall rules to be executed in a distributed computer system based on hit counts of the firewall rules and direct descendent relationships of destination entities of the firewall rules.

21 Claims, 6 Drawing Sheets

FIREWALL RULE MANAGEMENT FOR HIERARCHICAL ENTITIES

RELATED APPLICATIONS

Benefit is claimed under 35 U.S.C. 119(a)-(d) to Foreign Application Serial No. 201641043250 filed in India entitled "FIREWALL RULE MANAGEMENT FOR HIERARCHICAL ENTITIES", on Dec. 19, 2016, by NICIRA, INC., which is herein incorporated in its entirety by reference for all purposes.

BACKGROUND

Enterprises use firewalls extensively to protect their networks from malicious attacks. Firewalls have become a ubiquitous component across different network segments to fend off both insider and outsider threats as well as to enforce secure network access policy. For example, in a typical enterprise environment, there can be multiple virtual local area networks (VLANs) providing network segregation with defined access levels within these segments, as well as remote access over the public Internet for virtual private network (VPN) and mobile users. Thus, security administrators need to configure numerous firewall rules to satisfy various security policy requirement.

Firewall rule management becomes even more challenging as computers and even networks of enterprise networks become virtualized. With such virtualizations, changes to the enterprise networks usually occur more frequently due to, for example, migration of virtual machines (VMs) and ease of network reconfiguration. Thus, in these enterprise networks, security administrators must frequently map the higher-level network security policies to low-level firewall rules. This is a time-consuming error-prone manual process in which addition/updating of the rules is periodically needed to provide secure access to network resources. Policy enforcement is a continuous process that requires refining rules to meet changing network configurations without breaking existing policies. To ease this configuration complexity, newer policy systems have evolved that replace existing network topology (IP address) based firewall rules with entity (e.g., users, groups and virtual machines (VMs)) based firewall rules. However, even with these advances, there is still a need to further improve firewall rule management.

SUMMARY

Described herein are embodiments of a system and method for managing firewall rules for hierarchical entities. Example embodiments describe modifying a processing order of the firewall rules to be executed in a distributed computer system based on hit counts of the firewall rules and direct descendent relationships of destination entities of the firewall rules.

More particularly, a method for managing firewall rules for hierarchical entities in a distributed computer system in accordance with an embodiment of the invention comprises accessing a processing order of the firewall rules to be executed in the distributed computer system, wherein the processing order of the firewall rules reflects initial firewall policies, maintaining a hit count for each of the firewall rules, each firewall rule including a source entity, a destination entity and an access action, wherein at least destination entities of the firewall rules are arranged in a hierarchy, and modifying the processing order of the firewall rules based on hit counts of the firewall rules and direct descendent relationships of the destination entities of the firewall rules without breaking the initial firewall policies. In some embodiments, the steps of this method are performed when program instructions contained in a computer-readable storage medium is executed by one or more processors.

A system in accordance with an embodiment of the invention comprises memory and a processor. The processor is configured to access a processing order of firewall rules to be executed in a distributed computer system, wherein the processing order of the firewall rules reflects initial firewall policies, maintain a hit count for each of the firewall rules, each firewall rule including a source entity, a destination entity and an access action, wherein at least destination entities of the firewall rules are arranged in a hierarchy, and modify the processing order of the firewall rules based on hit counts of the firewall rules and direct descendent relationships of the destination entities of the firewall rules without breaking the initial firewall policies.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
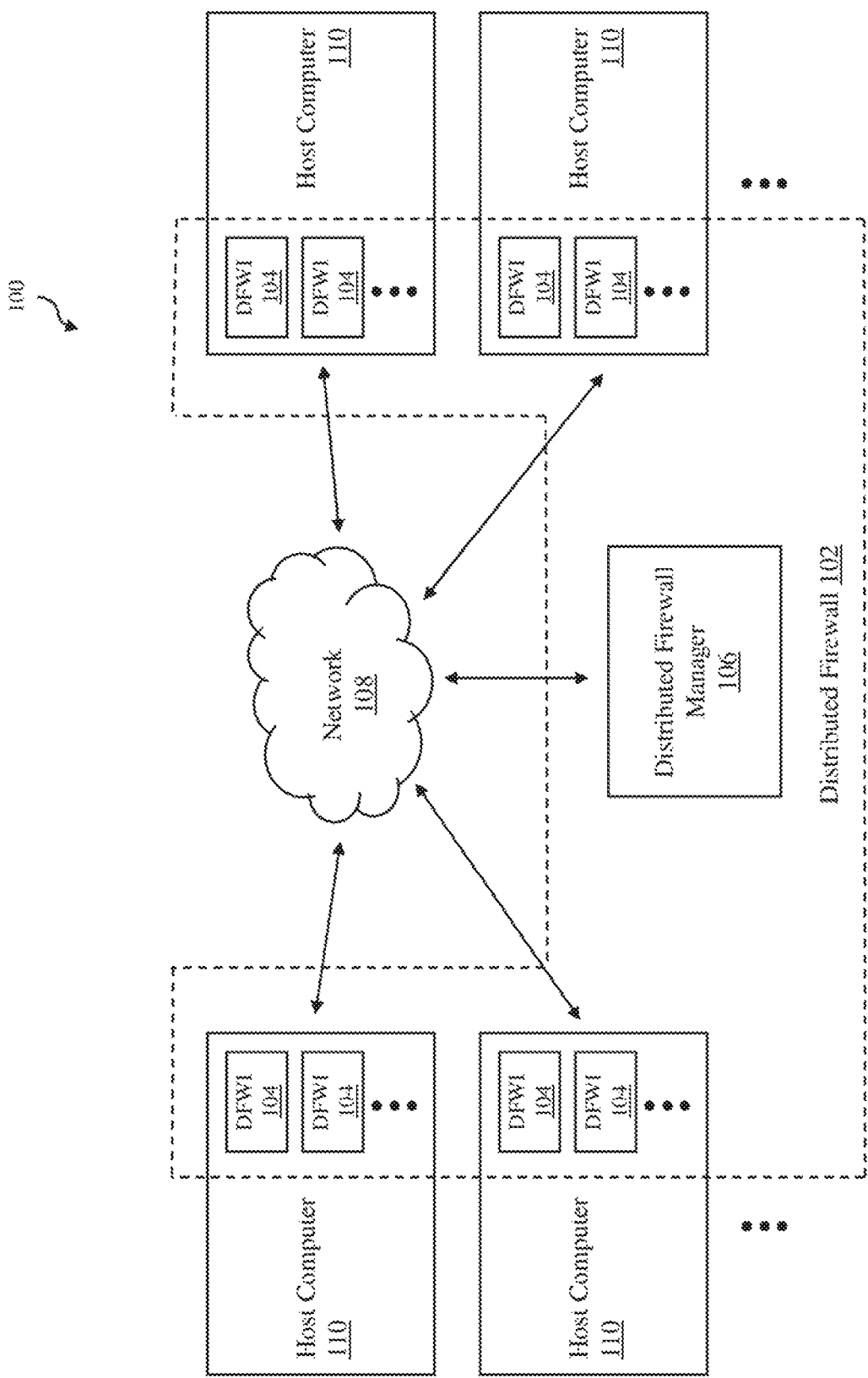
FIG. 1 is a block diagram of a distributed computer system in accordance with an embodiment of the invention.

FIG. 1 shows a distributed computer system 100 with a distributed firewall 102 in accordance with an embodiment. The distributed firewall 102 of the system provides network security throughout the system using distributed firewall instances 104, which control access at different entities in the system using firewall rules, which may number in the hundreds or even thousands. The distributed firewall 102 includes a distributed firewall manager 106, which allows an administrator to create and manage firewall policies that are converted to firewall rules and enforced by the distributed firewall instances 104. As explained in detail below, the distributed firewall 102 is designed to improve the enforcement of these firewall rules by reordering the processing order of the firewall rules to more efficiently process the firewall rules and/or selectively executing the firewall rules at source or destination entities to reduce the number of firewall rules being executed per entity. As a result, less CPU resources may be consumed for firewall operations and network performance may be increased.

As illustrated in FIG. 1, the distributed computer system 100 further includes a network 108 and a number of host computers 110. As explained below, the distributed computer system 100 supports virtualization of computers and networks, which allow flexibility with respect to resource usage and network configurations. Thus, the distributed firewall 102 can operate with logical overlay networks, such as those provided by VMware NSX™ available from VMware, Inc.

The network 108 can be any type of computer network or a combination of networks that allows communications between devices connected to the network. The network 108 may include the Internet, a wide area network (WAN), a local area network (LAN), a storage area network (SAN), a fibre channel network and/or other networks. The network 108 may be configured to support protocols suited for communications with storage arrays, such as Fibre Channel, Internet Small Computer System Interface (iSCSI), Fibre Channel over Ethernet (FCoE) and HyperSCSI.

The host computers 110 are physical computer systems that can host or support one or more virtual computing instances so that the virtual computing instances are executing on the physical computer systems. As used herein, the term "virtual computing instance" is any software entity that can run on a computer system, such as a software application, a software process, a virtual machine (VM) or a "container" that provides system-level process isolation or operating system level virtualization/containerization such as Docker™. The host computers may be servers that are commonly found in data centers. As an example, the host computers may be servers installed in a single server rack. However, in other embodiments, the host computers may be installed in multiple server racks in the same or different facilities. Still, in other embodiments, the host computers may be software processes running on multiple physical computer systems.

Figure 2:
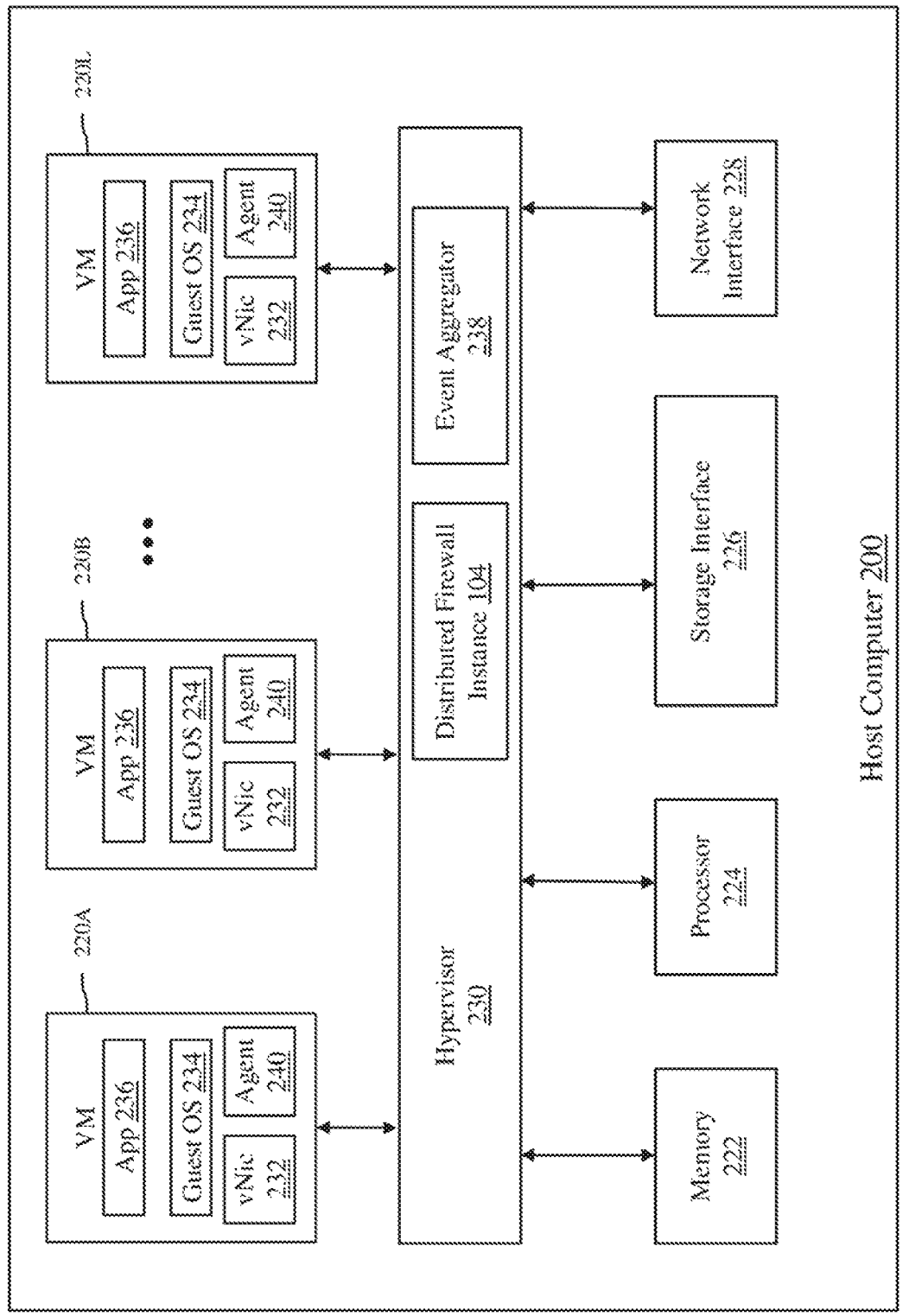
FIG. 2 is a block diagram of a host computer in accordance with an embodiment of the invention.

Turning now to FIG. 2, components of a host computer 200 that is representative of the host computers 110 in accordance with an embodiment of the invention are shown. In FIG. 2, the physical connections between the various components of the host computer are not illustrated. In the illustrated embodiment, the host computer is configured to support a number of virtual computing instances 220A, 220B . . . 220L (where L is a positive integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228, only one of each of these being shown in FIG. 2. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage (not shown). As an example, the storage interface may be a host bus adapter or a network file system interface. The network interface 228 is an interface that allows the host computer to communicate with other devices connected to the network 108. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs, including the network interfaces 228 of the host computer, which are shown in FIG. 2 as virtual network internet cards (VNICs). However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 234 and one or more guest applications 236. The guest operating system manages virtual system resources made available to the corresponding VM by the hypervisor, and, among other things, the guest operating system forms a software platform on top of which the guest applications run.

As shown in FIG. 2, the hypervisor 230 includes a distributed firewall instance (DFWI) 104 that may run in the kernel space. In alternate embodiments, the distributed firewall instance 104 may run in a privileged VM, which may be referred to in the field as a "Domain zero," "parent partition" or "root partition." The distributed firewall instance 104 manages firewall rules for the VMs 220A, 220B . . . 220L running on the host computer 200. The firewall rules for each VM may be enforced at the VNIC 232 of that VM. In alternate embodiments, the enforcement point can be at any point along the datapath, either predetermined, determined by configuration, or by an AppliedTo field of the firewall rule itself, e.g., as described in U.S. Pat. No. 9,276,904.

These firewall rules are enforced in accordance with a processing order for the firewall rules from top to bottom of the processing order. For each communication, e.g., packet, being processed, the firewall rules are individually processed following the processing order until there is a match or a hit, i.e., the source and destination entities match for a particular firewall rule for enforcement. Typically, the last firewall rule is a catch-all rule to ensure that every communication is either explicitly blocked or allowed access.

The hypervisor also includes an event aggregator 238, which aggregates network related events from all the VMs 220A, 220B . . . 220L running on the host computer 200, including firewall rule hits, which are sometimes referred to here as access logs. In a particular implementation, each VM includes a thin agent 240, which monitors network related events for that VM, and sends the network related events to the event aggregator 238. The event aggregator then stores the network related events as log records in a database, which may be stored in any data storage that can be accessed by the host computer 200, such as local data storage or remote data storage.

Turning back to FIG. 1, the distributed firewall manager 106 operates to provide firewall policies or rules to different components of the distributed computer system 100 so that network security policies can be enforced at the different components. In the illustrated embodiment, the appropriate firewall policies or rules are distributed to the virtual network interfaces, e.g., VNICs, of the virtual computing instances, e.g., VMs, running in the distributed computer system 100. Thus, in this embodiment, the virtual network interfaces of the virtual computing instances enforce the firewall rules.

The distributed firewall manager 106 may be implemented in any combination of hardware, software and firmware. In some implementations, the distributed firewall manager 106 is implemented as one or more software programs running on one or more physical computer systems, such as the host computer 200, using one or more processors associated with the physical computer systems.

The distributed firewall manager 106 uses entity based firewall rules for the network security policies. Usually, administrator has the need to group multiple entities and enforce policy on these groups. The distributed firewall manager 106 provides an abstraction called "security group" that can be used to club together multiple entities. The entities involved can be predefined containers (e.g., VMs, clusters of VMs, port groups or data centers), internet protocol (IP) set, or active directory (AD) users or groups. Then, the administrator has to define a "security policy" containing a list of actions. An action is either to allow or block a particular application (which may be identified by or mappable to a port number or other packet header field or tuple). Once the policy is created, it can be applied on source and destination "security groups". This policy information is passed onto the distributed firewall instances running on the host computers in the distributed computer system 100, each of which applies the policy on the participating host. It is noted here that there is no need to know the network topology information (switch and router layout) as the firewalls are distributed and firewall rules may be applied directly at the virtual network interfaces of the involved virtual computing instances, e.g., VMs. The precedence of the firewall rules is inherited from the "security policy" precedence. The security policy precedence is explicitly set by the administrator, who needs to ensure that he/she does not create conflicting policies. For example, if there has to be a web block policy for all "medical staff" entities and web allow policy for all "doctor" entities (the group of "doctor" entities being a subset of the group "medical staff" entities, then two policies have to be created, one policy to allow web access for "doctor" entities with higher precedence and another policy to block web access for "medical staff" entities with lower precedence.

In an embodiment, the security policies used by the distributed firewall manager 106 are modeled in a manner that is similar to the Unified Modeling Language (UML). In this embodiment, a security administrator can create groups that contain a set of virtual computing instances, active directory (AD) entities, which can be user groups or single users, and types of network accesses. The relationship between such an entity and a security policy is represented by an arrow which indicated "allow" or "block" with respect to access of the corresponding network resource. Once a policy is modelled, an automatic firewall rule generation engine in the distributed firewall manager 106 can be used to generate firewall rules. In addition, firewall rules can be entered or edited manually if a particular policy cannot be modelled in the above manner.

In some embodiments, the distributed firewall manager 106 and other components of the distributed firewall 102 may use Web Ontology Language (OWL) to formulate both the security policies and log records, which includes firewall hits. Ontologies are derived from description knowledge which is used in artificial intelligence to facilitate reasoning. Ontology is a knowledge representation of a particular domain based on a set of individuals (also called entities or objects) and the relationships existing between these individuals. The logical statements indicate memberships of individuals in classes or relationships between individuals. In addition, such logical statements are used to specify knowledge about the classes and relationships. The logical statements specify constraints on the data set and form the knowledge base. This simply means that knowledge is about finding relationships between entities. For instance, if the logical statement "Firewall is a network device which secures network" needs to be represented in ontologies, first the entities need to be extracted from the statement. Here, "firewall" and "network" are two different entities related by security. In ontologies, "firewall" and "network" are represented as classes (entities), and the relationships between them are made available through the properties. So, the representation would be:

Class Network:
hasSecurityDevice value Firewall
SubClassof (:Firewall :SecurityDevice)

which indicates that (1) Class "Network" has a property of "hasSecurityDevice" whose value is "Firewall," and (2) "Firewall" is a subclass of "SecurityDevice". This semantic is similar to that of an Object Oriented language.

Figure 3:
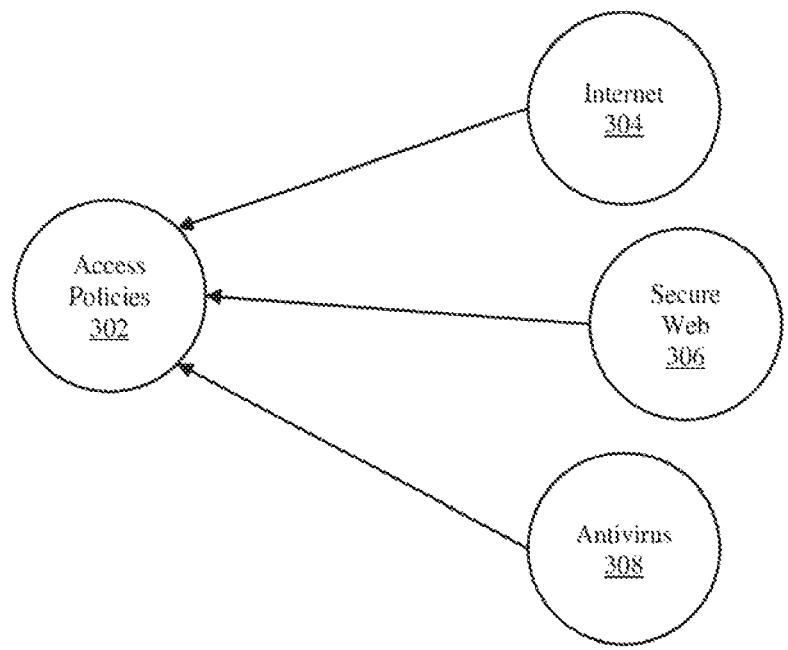
FIG. 3 illustrates exemplary sub-classes of a set of access policies.

Web Ontology Language (OWL) is a widely used language to represent ontologies. In some embodiments, the distributed computer system may use OWL to represent the constructs which define the security policies. In these embodiments, the distributed computer system can represent a knowledge base of classes and their associated relationships for the security policies. Typically, a security expert defines the ontology statements, which involves laying down the classes, sub-classes, and properties of a class which represent the relationships. For instance, FIG. 3 illustrates exemplary sub-classes of a set of access policies. In this example, the class of access policies 302 includes sub-classes of Internet 304, internal secure Web 306 and antivirus service 308.

Figure 4:
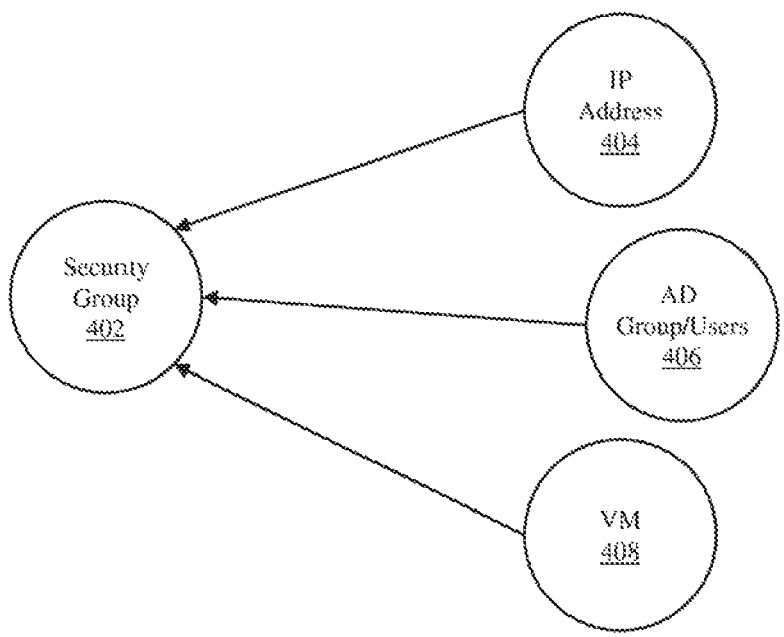
FIG. 4 illustrates a class of security group in accordance with an embodiment of the invention.

In general, classification of security policies and their associated properties should be generic so that the policy processing can be performed in a vendor agnostic manner. The security policies can be enforced on security groups (also referred to as containers), which can be a collection of VMs, IP addresses, or AD user groups/users, as illustrated in FIG. 4. Here the class of security group 402 can include a set of IP address 404, one or more AD user groups/users 406 and one or more VMs 408.

Each "security group" class can have the properties hasInternetAccess, hasSecureWeb or hasAntiVirus (see FIG. 3), depending on the way administrator defines the policy. Usually this configuration is represented by a security group's arrow pointing to the access policy which would allow or block rule. These kinds of relationships involving more than one individual property typically cannot be represented in standard OWL. A set of OWL extended axioms called Semantic Web Rule Language (SWRL) can be used to represent such relationships. SWRL provides horn-like rules using an antecedent (body) and consequent (head) on the class properties. SWRL facilitates composition of standard conditional statement (i.e., IF . . . THEN) based rules.

For example, in a hospital data center, assume there is a policy to block public Internet access to the nurses. To validate this policy, all the access logs belonging to the "Nurse" AD group have to be checked for Internet access. The SWRL statement "SWRL (1)" below automates the process for finding the log record which has destination address as public IP. Assume that there is a pre-defined class "Access" with property hasDestinationAddress. This property is set to "PublicIP" if the destination address indicates a destination other than the nurses' network prefix.

SWRL(1): Access(?x)^not contains(?DestinationAddress, "<nurse network prefix>")→hasDestinationAddres(?x, "Public IP")

The access logs also provide the AD group name corresponding to the IP address accessed. The SWRL rule "SWRL (2)" below is used to check for the hasGroup and hasDestinationAddress properties for classes "Nurse" and "PublicIP," respectively. If SWRL (2) is true, the system moves the log record to the "BrokenPolicyLog" class. This list of BrokenPolicyLog contains the log records of all the nurse VMs that have attempted to access the Internet.

SWRL (2): TABLE-US-00003 Access(?x)^hasGroup(?x, Nurse)^hasDestinationAddress(?x, PublicIP)→BrokenPolicyLog(?x)

After the administrator models the policies, the modeled policies are translated to a set of SWRL rules (statements). The log data is typically stored in a relational database (RDB) which is also translated to OWL semantic data to correlate it with defined policies rules. A number of methods can be used to convert RDB-formatted data to OWL semantic data, including a W3C standard to convert RDB to Resource Description Framework (RDB2RDF). This standard can directly translate data from RDB format to RDF format which is similar to the OWL format. In general, the translation process involves converting each log record to OWL class individuals and setting the class properties based on the appropriate database fields. If, for example, there are millions of access records for 100 users, in OWL format these records are represented as a set of 100 individual classes with the appropriate properties set in them. This OWL formatted data is then loaded in an OWL reasoner, which may be implemented in the distributed firewall manager 106. The OWL reasoner validates all the SWRL rules by comparing the properties on the classes identifies the individuals which breach the policies.

In a typical enterprise network with distributed firewall, there may be thousands of firewall rules that each firewall would need to match for a network packet to decide the action (i.e., allow or block). This is a CPU intensive process that may affect the performance of network applications. Even though there are multiple rules in each firewall, only a few set of rules often matches the packet as the users access only a few set of resources for their typical tasks. Because of this, most of the firewall rules hardly get a match. But conventional firewalls do not have the intelligence to reorder the rules to put the rules at the top for which high traffic is generated as this would break the firewall policies intended by the administrator. Thus, conventional firewalls have no other option except to execute the rules in the processing order defined by the administrator.

In an embodiment, the distributed firewall manager 106 is designed to selectively reorder the firewall rules using active directory groups/users hierarchy. If policies are configured with active directory users or groups, there can be inferences from the hierarchy of the active directory users/groups that can be made such that the policies, and thus, the corresponding firewall rules, can be reordered without breaking the policies. This is especially useful when there is a policy involving disjoint groups (no direct descendent relationship) with other policy's destination group. Such a policy presence would be moved to different order sequence which does not affect the administrator intention. This process will be described below using an example of a health care organization, which is illustrated in FIG. 5.

Figure 5:
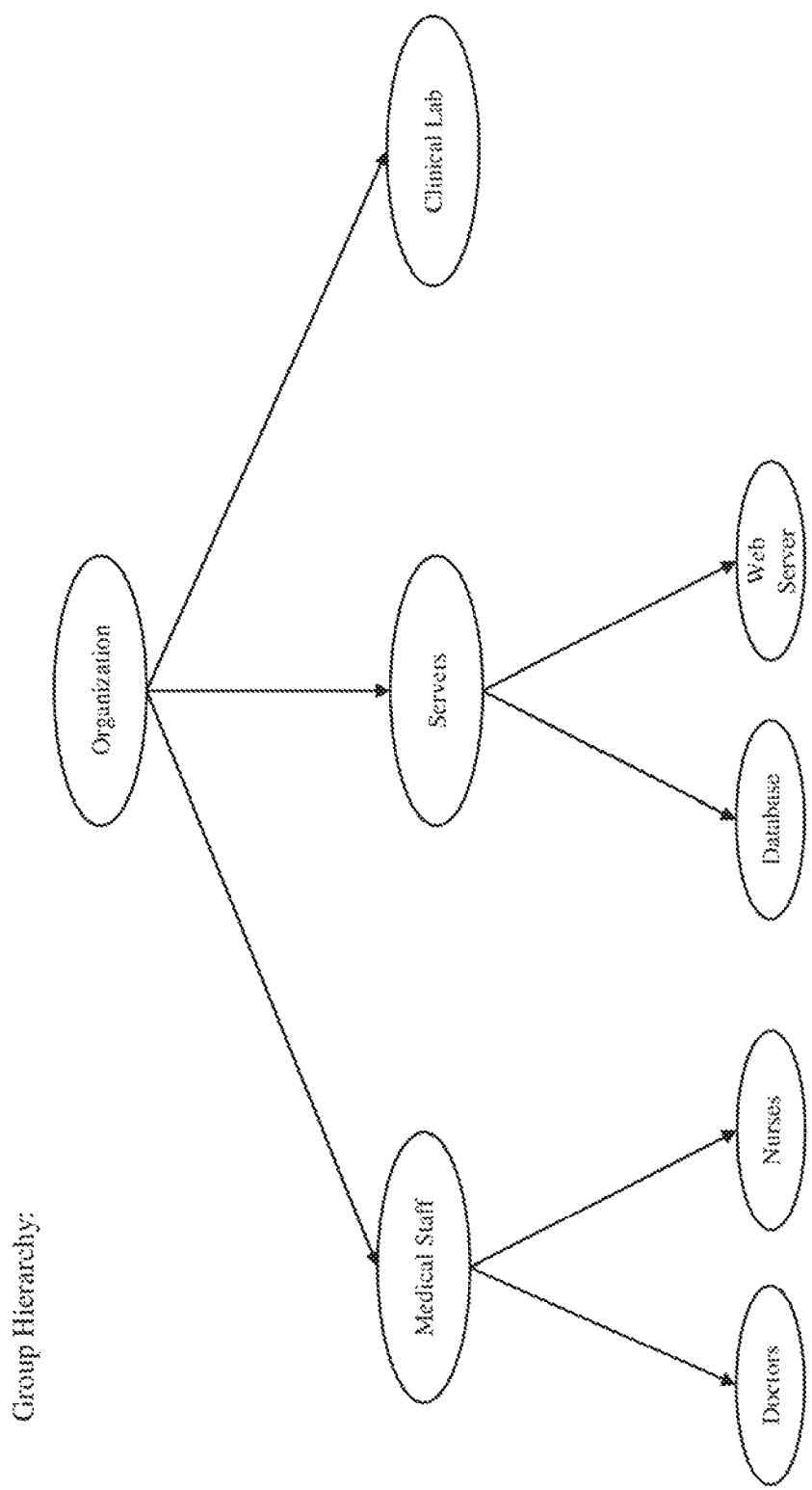
FIG. 5 illustrates a group hierarch of a health care organization in accordance with an embodiment of the invention.

In FIG. 5, a group hierarchy of a health care organization is depicted. As shown in the group hierarchy, a group "Organization" has subgroups—"Medical Staff", "Servers" and "Clinical Labs". The subgroup "Medical Staff" has sub-subgroups—"Doctors" and "Nurses". The subgroup "Servers" has sub-subgroups "Database" and "Web Server". Let's assume that an administrator has configured five (5) security policies for the subgroups and sub-subgroups of the health care organization. The five security policies are listed in a table below.

TABLE 1

| Order | Policy | Source Entity | Action | Destination Entity |
| --- | --- | --- | --- | --- |
| 1 | P1 | Doctors | Access-Allow | Clinical Labs |
| 2 | P2 | Doctors | Access-Block | Database |
| 3 | P3 | Doctors | Access-Allow | Servers |
| 4 | P4 | Medical Staff | Access-Block | Servers |
| 5 | P5 | Any | Access-Block | Any |

Here, "Doctors" are allowed access to "Clinical Labs" (P1) and "Doctors" are blocked access to "Database" (P2), which is a sub-group of "Servers". However, "Doctors" are allowed access to "Web Servers", which is another sub-group of "Servers" since "Doctors" are allowed access to "Servers" (P3) and there is no policy specifically blocking "Doctors" access to "Web Servers". "Medical Staff" are not allowed access to any "Servers" (P4). Finally, there is a default policy to block access between any entities as a catch-all policy (P5).

Let's assume that all the polices are applied on doctors' VMs. From the active directory group relationship as shown in FIG. 5, "Servers" and "Clinical Labs" are disjoint groups. As used herein, disjoint groups are groups that do not have a direct descendent relationship, i.e., one of the groups does not descend from the other group. In operation, policies P1-P5 will be applied as firewall rules in a predefined processing order, which is initially set by the administrator. Thus, in this example, policies P1-P5 will be executed in the following order P1, P2, P3, P4, P5.

Let's further assume that the distributed firewall manager 106 sees less traffic matching the P1 rule for a particular day since VMs of "Doctors" are accessing "Clinical Labs" only under certain limited conditions. With this information, the distributed firewall manager 106 can move the P1 rule down to more efficiently process traffic with respect to firewall operation. To reorder this policy without changing the administrator's intent, the distributed firewall manager 106 needs to check whether the destination entity for the P1 policy is disjoint with the destination entity for the succeeding policy in the sequence. Using the active directory relationship information for the organization, which may be stored locally or remotely as a database, the distributed firewall manager 106 can try to move down the rule one by one checking whether the policy has disjoint destination entity with the next policy.

This checking process performed by the distributed firewall manager 106 involves checking each generation for a parent-child relationship to determine if destination entities of different polices have a direct descendent relationship. As an example, in FIG. 5, "Organization" and "Doctors" are not disjoint since there is a parent-child relationship between "Organization" and "Medical Staff," and "Medical Staff" has a parent-child relationship with "Doctors." With OWL, this derivation of descendant relationships can be inferred automatically. As an example, if it is specified in OWL: {Organization contains MedicalStaff, Servers, ClinicalLab} and {MedicalStaff contains Doctors, Nurses}, with the "contain" mentioned as transitivity property, an OWL-implemented distributed firewall manager will infer the following additional properties: {Organization contains Doctors, Nurses}, which asserts that "Organization" has parent-child relationships with "Doctors", "Nurses" and their children. Thus, it can be readily determined that "Organization" and "Doctors" have a direct descendent relationship, and as such, are not disjoint.

With respect to the policies P1-P5, the distributed firewall manager 106 will move the P1 policy from the top position down to the fourth position since the destination entity of the P1 policy is disjoint with the destination entities of the P2-P4 policies. However, the destination entity of the P1 policy is not disjoint with the destination entity of the P5 policy since "Doctors" and "Any" are not disjoint groups. That is, "Doctors" has a direct descendent relationship with at least one other group in the group hierarchy of the health care organization. Thus, the P1-P5 policies will be re-ordered as shown in the following table.

TABLE 2

| Order | Policy | Source Entity | Action | Destination Entity |
|---|---|---|---|---|
| 1 | P2 | Doctors | Access-Block | Database |
| 2 | P3 | Doctors | Access-Allow | Servers |
| 3 | P4 | All Medical Staff | Access-Block | Servers |
| 4 | P1 | Doctors | Access-Allow | Clinical Labs |
| 5 | P5 | Any | Access-Block | Any |

This reordering of the policies based on the number of "hits' greatly improves the throughput performance of the distributed firewall 102 as the number of rules that needs to be matched per communication data segment, e.g., network packet, would be reduced. Similarly, if the network traffic for a particular firewall rule matches more frequently for a day, that rule can be moved up after checking if the firewall rule is disjoint with respect to destination entities with the next preceding policy.

In some embodiments, the security policies are reordered by the distributed firewall manager 106 or one or more of the distributed firewall instances 104, and thus, the corresponding firewall rules are also reordered. In other embodiments, only the firewall rules may be reordered by the distributed firewall manager 106 or one or more of the distributed firewall instances 104.

Figure 6:
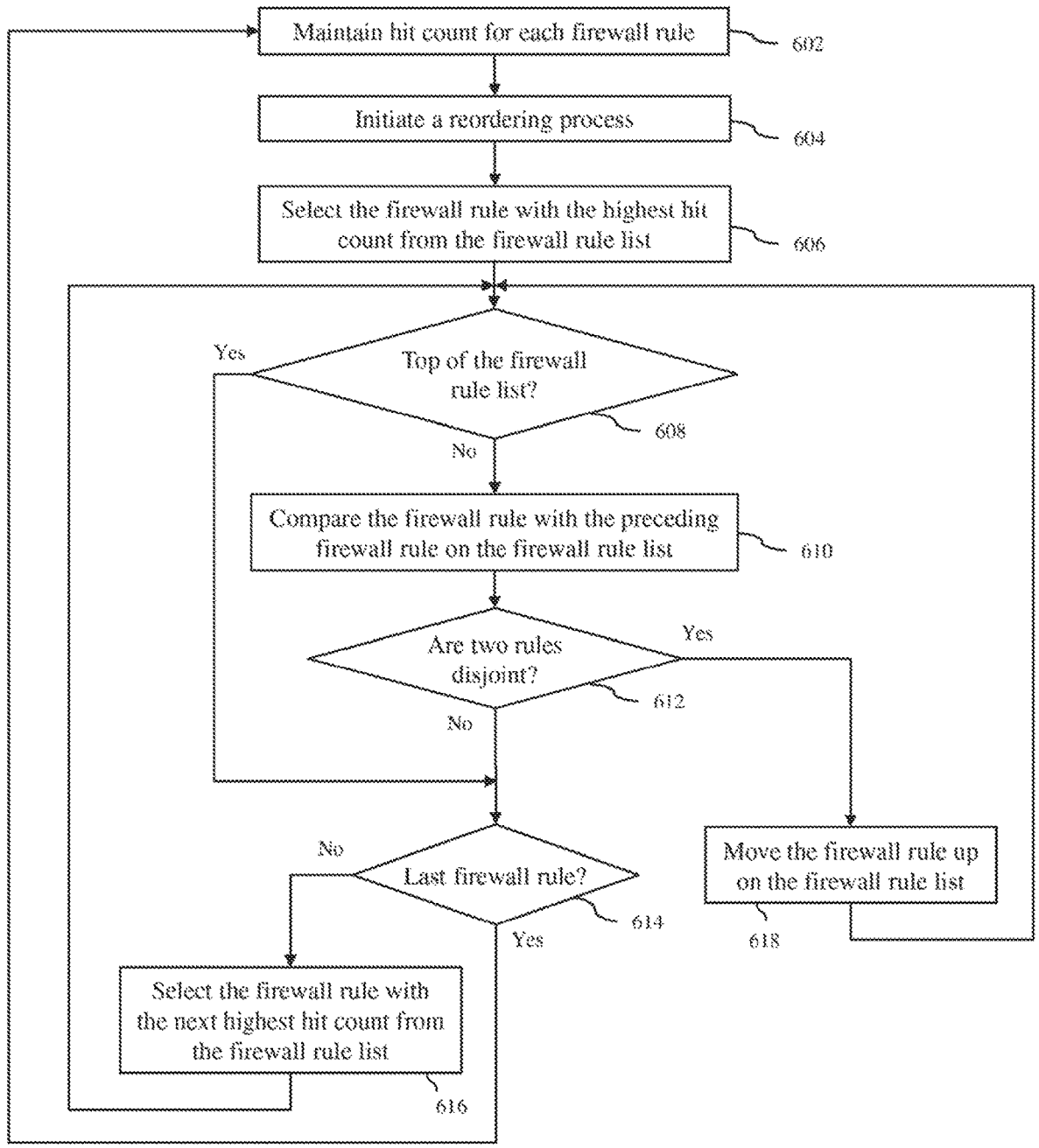
FIG. 6 is a process flow diagram of a firewall rule reordering operation in accordance with an embodiment of the invention.

The firewall rule reordering operation performed by the distributed firewall manager 106 in accordance with an embodiment of the invention will now be described with references to the flow diagram of FIG. 6. At block 602, hit count for each firewall rule in a firewall rule list is maintained. The hit counts for the firewall rules are collected by the distributed firewall manager 106 using the log records from each of the host computers 110 in the distributed computer system 100. In this embodiment, the firewall rule list is arranged so that the processing order of the firewall rules starts from the top of the list and then proceeds down the list until the applicable firewall rule is found. At block 604, a reordering process of the current firewall rule list is initiated by the distributed firewall manager. The reordering process may be initiated periodically at defined time intervals, for example, hourly, daily or weekly.

Next, at block 606, the firewall rule with the highest hit count is selected from the firewall rule list. Next, at block 608, if the selected firewall rule is at the top of the firewall rule list, the operation proceeds to block 614.

If, at block 608, the selected firewall is not at the top of the firewall rule list, the operation proceeds to block 610, where the selected firewall rule is compared with the preceding firewall rule on the firewall rule list that had not been previously processed, i.e., the firewall rule immediately above or further above the selected firewall rule that had not been previously processed. Next, at block 612, a determination is made whether the two firewall rules are disjoint. This determination involves comparing the destination entity of one firewall rule with the destination entity of the other firewall for any direct descendent relationship. If there is no direct descendent relationship, then the two firewall rules are determined to be disjoint firewall rules.

If the two firewall rules are determined not to be disjoint at block 612, then the operation proceeds to block 614, where a determination is made whether the current selected firewall rule is the last firewall rule on the firewall rule list. If the current selected firewall rule is the last firewall rule, then the operation proceeds back to block 602 to maintain hit counts for the firewall rules until the next reordering process is initiated. If the current selected firewall rule is not the last firewall rule, then the operation proceeds to block 616, where the firewall rule with the next highest hit count in the firewall rule list is selected to be processed. The operation then proceeds back to block 608.

If at block 612, it is determined that the two firewall rules are disjoint, then the operation proceeds to block 618, where the current selected firewall rule is moved up above the previous preceding firewall rule on the firewall rule list. The operation then proceeds back to block 608 so that the current selected firewall rule can be compared with the next preceding firewall rule on the firewall rule list, if any.

In this manner, the firewall rules will be reordered based on firewall rule hit counts without changing the original intent of the administrator. The final processing order of the firewall rules on the firewall rule list will be used to enforce network access at distributed firewall instances 104 in the distributed computer system 100.

As noted above, in some embodiments, the reordering process may be executed at one or more distributed firewall instances 104. In these embodiments, the above-described reordering operation is performed by one of the distributed firewall instances running on a particular host computer, where the reordered firewall rules are applied at that particular host computer. Thus, in some situations, different host computers may be enforcing the same set of firewall rules but in different processing orders.

In an embodiment, the throughput performance of the distributed firewall 102 in the distributed computer system 100 may be further improved by changing the firewall enforcement between the source and the destination entities. In the distributed computer system 100, since the distributed firewall rules are applied at the virtual network interfaces, e.g., VNIC, of the virtual computing instances, e.g., VMs, rather than the intermediate network devices, such as routers, the firewall rules can be applied either at the virtual network interface of the source or destination entity. As an example, the policy P1 "Doctors access allow Clinical Lab" can be applied either on the "Doctors" VMs (source entities) or the "Clinical Lab" VMs (destination entities). On the "Doctors" VMs, the policy has to be an outbound allow rule enforced by their respective virtual network interfaces. On the "Clinical Lab" VMs, the policy has to be an inbound allow rule. The distributed firewall manager 106 may be configured to make a decision whether a particular firewall rule should be enforced at the source or destination entity. This decision can be made based on the number of users in the "Doctors" group compared to the number of users in the "Clinical Lab" group. These numbers of users can be based on the number of active virtual computing instances, e.g., VMs, that have been assigned to the different groups.

In the above example of "Doctors" and "Clinical Lab", let's assume that there many more "Doctors" VMs than "Clinical Lab" VMs. Thus, if the firewall rule for policy P1 is applied only on the "Clinical Lab" VMs, then the number of firewall rules at the "Doctor" VMs will be reduced. Consequently, the end result is a reduction of the number of firewall rules that need to be executed per VM since there are fewer "Clinical Lab" VMs than "Doctor" VMs. This kind of decision to apply the firewall rules on the source or destination entities based on the number of users in the active directory groups can significantly increase throughput performance of the distributed firewall in the distributed computer system 100 without affecting the administrator intended policy configuration.

Figure 7:
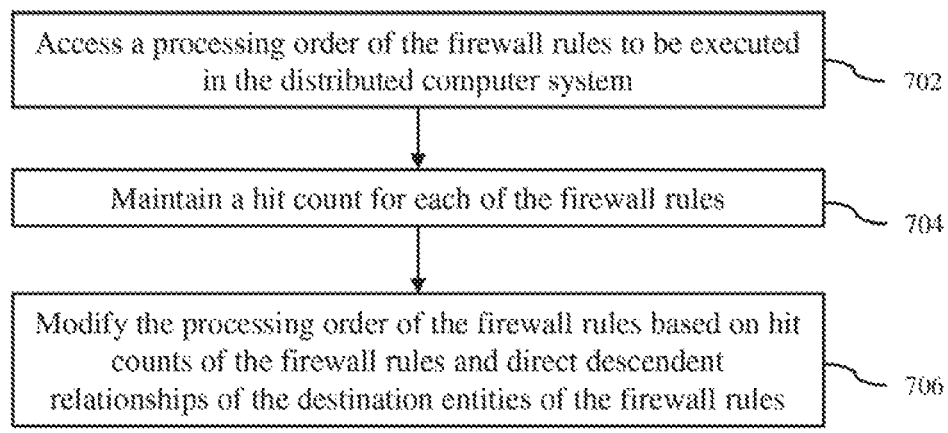
FIG. 7 is a flow diagram of a method for managing firewall rules for hierarchical entities in a distributed computer system in accordance with an embodiment of the invention.

A method for managing firewall rules for hierarchical entities in a distributed computer system in accordance with an embodiment of the invention is described with reference to a flow diagram of FIG. 7. At block 702, a processing order of the firewall rules to be executed in the distributed computer system is accessed. The processing order of the firewall rules reflects initial firewall policies, which are initially set by a security administrator. At block 704, a hit count for each of the firewall rules is maintained. Each firewall rule includes a source entity, a destination entity and an access action, wherein at least destination entities of the firewall rules are arranged in a hierarchy. At block 706, the processing order of the firewall rules is modified based on hit counts of the firewall rules and direct descendent relationships of the destination entities of the firewall rules without breaking the initial firewall policies.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing firewall rules for hierarchical entities in a distributed computer system, the method comprising:
accessing a processing order of the firewall rules to be executed in the distributed computer system, wherein the processing order of the firewall rules reflects initial firewall policies;
maintaining a hit count for each of the firewall rules, each firewall rule including a source entity, a destination entity and an access action, wherein at least destination entities of the firewall rules are arranged in a tree structure hierarchy, where some of the destination entities have parent-child relationships in the tree structure hierarchy and some of the destination entities have no direct descendent relationships in the tree structure hierarchy; and
modifying the processing order of the firewall rules based on hit counts of the firewall rules and direct descendent relationships of the destination entities of the firewall rules in the tree structure hierarchy without breaking the initial firewall policies.

2. The method of claim 1, wherein modifying the processing order of the firewall rules includes moving a particular firewall rule of the firewall rules before another firewall rule in the processing order when the hit count of the particular firewall rule is greater than the hit count of the another firewall rule and there is no direct descendent relationship between the destination entities of the particular firewall rule and the another firewall rule.

3. The method of claim 1, wherein modifying the processing order of the firewall rules includes moving a particular firewall rule of the firewall rules after another firewall rule in the processing order when the hit count of the particular firewall rule is less than the hit count of the another firewall rule and there is no direct descendent relationship between the destination entities of the particular firewall rule and the another firewall rule.

4. The method of claim 1, further comprising enforcing a particular firewall rule of the firewall rules at the source entity of the particular firewall rule when the number of users of a group to which the source entity belongs is less than the number of users of a group to which the destination entity belongs.

5. The method of claim 1, further comprising enforcing a particular firewall rule of the firewall rules at the destination entity of the particular firewall rule when the number of users of a group to which the source entity belongs is greater than the number of users of a group to which the destination entity belongs.

6. The method of claim 1, further comprising enforcing the firewall rules using virtual network interfaces of virtual computing instances, wherein the virtual computing instances correspond to the source and destination entities of the firewall rules.

7. The method of claim 6, wherein the virtual network interfaces are virtual network internet cards (VNICs) of virtual machines.

8. The method of claim 1, further comprising enforcing the firewall rules using distributed firewall instances running on virtual computing instances in the distributed computer system.

9. The method of claim 1, wherein the destination entities specified in the firewall rules as matching criteria are organized in different groups in the tree structure hierarchy, and different policies are configured for at least some of the different group in the tree structure hierarchy, and wherein modifying the processing order of the firewall rules includes modifying the processing order of the firewall rules without breaking the different polices for the different groups of destination entities in the tree structure hierarchy.

10. A non-transitory computer-readable storage medium containing program instructions for managing firewall rules for hierarchical entities in a distributed computer system, wherein execution of the program instructions by one or more processors of a computer system causes the one or more processors to perform steps comprising:
accessing a processing order of the firewall rules to be executed in the distributed computer system, wherein the processing order of the firewall rules reflects initial firewall policies;
maintaining a hit count for each of the firewall rules, each firewall rule including a source entity, a destination entity and an access action, wherein at least destination entities of the firewall rules are arranged in a tree structure hierarchy, where some of the destination entities have parent-child relationships in the tree structure hierarchy and some of the destination entities have no direct descendent relationships in the tree structure hierarchy; and
modifying the processing order of the firewall rules based on hit counts of the firewall rules and direct descendent relationships of the destination entities of the firewall rules in the tree structure hierarchy without breaking the initial firewall policies.

11. The computer-readable storage medium of claim 10, wherein modifying the processing order of the firewall rules includes moving a particular firewall rule of the firewall rules before another firewall rule in the processing order when the hit count of the particular firewall rule is greater than the hit count of the another firewall rule and there is no direct descendent relationship between the destination entities of the particular firewall rule and the another firewall rule.

12. The computer-readable storage medium of claim 10, wherein modifying the processing order of the firewall rules includes moving a particular firewall rule of the firewall rules after another firewall rule in the processing order when the hit count of the particular firewall rule is less than the hit count of the another firewall rule and there is no direct descendent relationship between the destination entities of the particular firewall rule and the another firewall rule.

13. The computer-readable storage medium of claim 10, wherein the steps further comprises enforcing a particular firewall rule of the firewall rules at the source entity of the particular firewall rule when the number of users of a group to which the source entity belongs is less than the number of users of a group to which the destination entity belongs.

14. The computer-readable storage medium of claim 10, wherein the steps further comprises enforcing a particular firewall rule of the firewall rules at the destination entity of the particular firewall rule when the number of users of a group to which the source entity belongs is greater than the number of users of a group to which the destination entity belongs.

15. The computer-readable storage medium of claim 10, wherein the steps further comprises enforcing the firewall rules using virtual network interfaces of virtual computing instances, wherein the virtual computing instances correspond to the source and destination entities of the firewall rules.

16. The computer-readable storage medium of claim 15, wherein the virtual network interfaces are virtual network internet cards (VNICs) of virtual machines.

17. The computer-readable storage medium of claim 10, wherein the steps further comprises enforcing the firewall rules using distributed firewall instances running on virtual computing instances in the distributed computer system.

18. A system comprising:
memory; and
a processor configured to:
    access a processing order of firewall rules to be executed in a distributed computer system, wherein the processing order of the firewall rules reflects initial firewall policies;
    maintain a hit count for each of the firewall rules, each firewall rule including a source entity, a destination entity and an access action, wherein at least destination entities of the firewall rules are arranged in a tree structure hierarchy, where some of the destination entities have parent-child relationships in the tree structure hierarchy and some of the destination entities have no direct descendent relationships in the tree structure hierarchy; and
    modify the processing order of the firewall rules based on hit counts of the firewall rules and direct descendent relationships of the destination entities of the firewall rules in the tree structure hierarchy without breaking the initial firewall policies.

19. The system of claim 18, wherein the processor is configured to move a particular firewall rule of the firewall rules before another firewall rule in the processing order when the hit count of the particular firewall rule is greater than the hit count of the another firewall rule and there is no direct descendent relationship between the destination entities of the particular firewall rule and the another firewall rule.

20. The system of claim 18, wherein the processor is configured to move a particular firewall rule of the firewall rules after another firewall rule in the processing order when the hit count of the particular firewall rule is less than the hit count of the another firewall rule and there is no direct descendent relationship between the destination entities of the particular firewall rule and the another firewall rule.

21. The system of claim 18, wherein the processor is configured to selectively enforce a particular firewall rule of the firewall rules at the source or destination entity of the particular firewall rule depending on the number of users of a group to which the source entity belongs and the number of users of a group to which the destination entity belongs.

* * * * *